(12) United States Patent
Cheikh

(10) Patent No.: US 12,337,794 B2
(45) Date of Patent: Jun. 24, 2025

(54) METHOD FOR ACTIVATING A VEHICLE FUNCTION AND ASSOCIATED ACTIVATION DEVICE

(71) Applicant: Continental Automotive Technologies GmbH, Hannover (DE)

(72) Inventor: Mohamed Cheikh, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 253 days.

(21) Appl. No.: 18/143,292

(22) Filed: May 4, 2023

(65) Prior Publication Data

US 2023/0373440 A1 Nov. 23, 2023

(30) Foreign Application Priority Data

May 19, 2022 (FR) ...................................... 2204760

(51) Int. Cl.
  *B60R 25/24* (2013.01)
(52) U.S. Cl.
  CPC ................................. *B60R 25/245* (2013.01)
(58) Field of Classification Search
  CPC ....... B60R 25/245; B60R 25/01; B60R 25/24; B60R 2325/10; B60R 2325/101
  See application file for complete search history.

(56) References Cited

U.S. PATENT DOCUMENTS 9,803,391 B2 10/2017 Banvait
10,685,513 B2 6/2020 Godet
(Continued)

FOREIGN PATENT DOCUMENTS

FR 3010363 A1 3/2015
FR 3044497 A1 6/2017
FR 3111312 A1 12/2021

OTHER PUBLICATIONS

Vy, T.D., et al., "A Precise Tracking Algorithm using PDR and Wi-Fi/iBeacon Corrections for Smartphones", Student Member, IEEE, IEEE Access, Jan. 31, 2021, pp. 1-16.
(Continued)

*Primary Examiner* — Nabil H Syed
*Assistant Examiner* — Cal J Eustaquio
(74) *Attorney, Agent, or Firm* — Buchanan Ingersoll & Rooney PC

(57) ABSTRACT

The invention relates to a method for activating a function of a motor vehicle by means of an activation device comprising at least four ultra-wide-band communication external antenna modules and an ultra-high-frequency communication module, from an item of "hands-free" portable access equipment (SD) carried by a user, comprising an accelerometer, a gyroscope and a magnetometer, the activation of the function being triggered by detection of the presence of the user in a predetermined zone around the vehicle, and depending on an authentication result, the method comprising the following steps:
  s) determining an initial position of the item of access equipment with respect to the vehicle,
  t) measuring the values from the gyroscope, from the magnetometer and from the accelerometer,
  u) obtaining a value of the probability of the intention to activate a vehicle function,
  v) comparing the probability value with at least one predetermined threshold,
  w) transmitting, at ultra-high frequency from said item of equipment to said vehicle, a request to place the external antenna modules in partial or full ultra-wide-band communication operation, depending on the result of said comparison, (Continued)

x) activating the vehicle function, depending on an estimate of the distance between said item of equipment and the vehicle made by said external antenna modules thus activated in the ultra-wide band.

15 Claims, 3 Drawing Sheets

(56) References Cited

U.S. PATENT DOCUMENTS 10,697,226 B2    6/2020  Gussen et al.
2016/0075307 A1*  3/2016  Jakobsson ............... B60R 25/31
                                                                    701/2
2017/0074000 A1*  3/2017  Banvait .............. G07C 9/00571

OTHER PUBLICATIONS

Del Rosario, M.B. et al., "Tracking the Evolution of Smartphone Sensing for Monitoring Human Movement", Sensors, 2015, vol. 15, pp. 18901-18933; doi:10.3390/s150818901.
French Search Report for French Application No. 2204760, dated Jan. 10, 2023 with translation, 10 pages.

* cited by examiner

[Fig. 3]
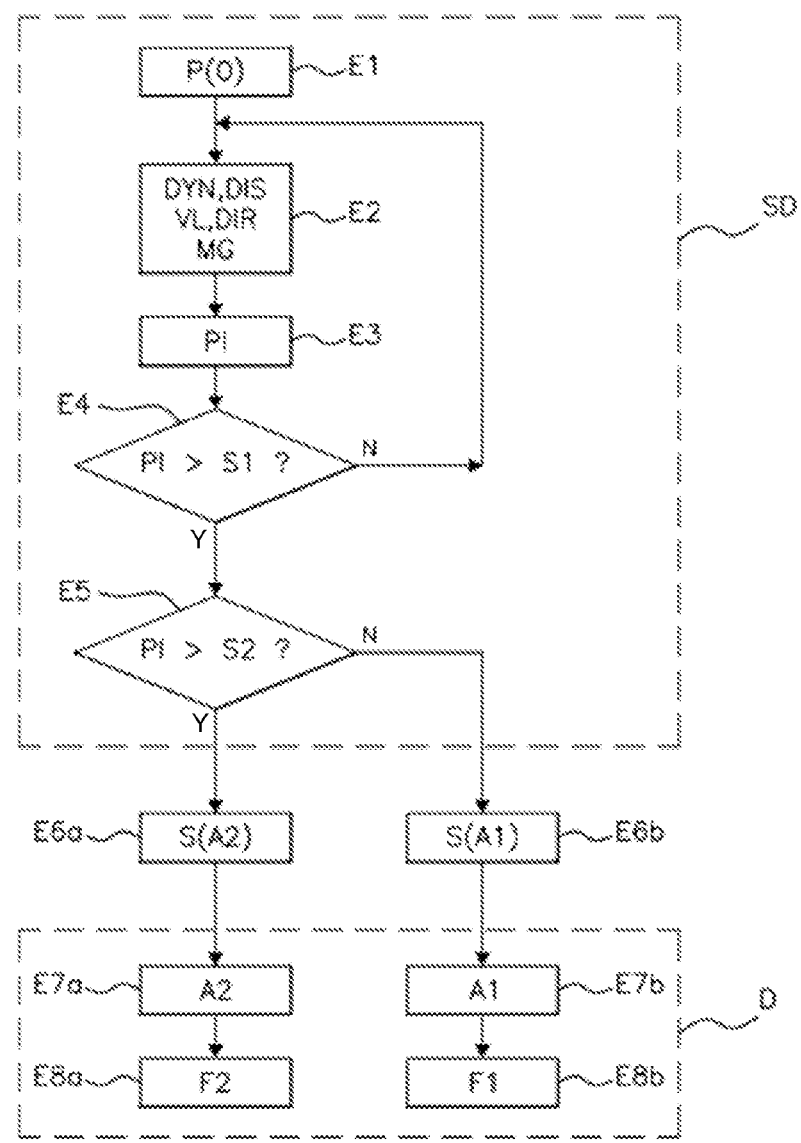

METHOD FOR ACTIVATING A VEHICLE FUNCTION AND ASSOCIATED ACTIVATION DEVICE

CROSS REFERENCE TO RELATED APPLICATIONS

This application claims priority to French Patent Application No. 2204760, filed May 19, 2022, the contents of such application being incorporated by reference herein.

FIELD OF THE INVENTION

The invention relates to a method for activating a function of a motor vehicle and an associated activation device. The invention applies particularly but entirely non-limitingly to the function of hands-free access to a motor vehicle, that is to say to the function of locking and unlocking the opening elements of a motor vehicle.

BACKGROUND OF THE INVENTION

In a motor vehicle, it is known practice to use vehicle function activation devices which can detect the presence of a hand or of a foot of a user of the vehicle and thus make it possible to lock or unlock all or some of the opening elements of the vehicle, for example the doors or the trunk. By way of example, the detection of the presence of a hand of a user on or in front of a door handle in conjunction with the recognition of an identifier of an item of "hands-free" access equipment carried by this user makes it possible to lock and unlock these opening elements.

What is referred to as a "hands-free" access system for accessing a motor vehicle makes it possible for an authorized user to lock and/or unlock the opening elements of their vehicle without having to physically press buttons on a key. For this purpose, the vehicle identifies a portable item of equipment such as a fob or remote control or even a key carried by the user and, if the fob or the remote control or indeed the key is located in a predetermined zone around the vehicle or in the vehicle and is identified as belonging to the vehicle, then the vehicle automatically locks/unlocks its opening elements according to the intention of the user, without the user having to physically manipulate a key.

To achieve this, when the user approaches the vehicle, communication is established over a wireless communication link between the item of "hands-free" access equipment, for example an electronic fob or a smartphone, and the vehicle function activation device in order to authenticate said item of access equipment by virtue of its identifier.

To this end, the activation device comprises at least one radiofrequency antenna making it possible to receive the identifier sent by the item of "hands-free" access equipment. The activation device is connected to an electronic computer of the vehicle ("ECU": abbreviation for "electronic control unit") to which it transmits the identifier.

According to the prior art, the item of access equipment is generally an electronic fob. The signal received by the antenna of the activation device, comprising the identifier of the item of access equipment, is transmitted via RF (radiofrequency) or LF (low-frequency) waves. The precise location of the portable item of equipment around the vehicle is found by measuring the intensity of the LF signal received by the portable item of equipment (via the antennas and the electronic control unit) from the vehicle, more commonly called RSSI (received signal strength indication) measurements. The measurement of the power of each signal received by the portable item of equipment from each antenna of the plurality of LF antennas located on the vehicle V is received and analyzed by an activation device, installed in the vehicle, which thus determines, via triangulation, the position of the portable item of equipment with respect to said LF antennas, i.e. with respect to the vehicle.

According to the location of the portable item of equipment identified by the vehicle, in said location zones, certain actions which are specific to said location zones are performed automatically: unlocking/locking or preliminarily turning on the lighting in the passenger compartment (also called "welcome lighting").

Nowadays, however, it is increasingly common to use a mobile telephone to perform authentication functions, this making it possible to avoid using a dedicated electronic fob and thus to limit the number of items of equipment. The majority of mobile telephones do not possess RF or LF communication means. It therefore becomes necessary to adapt the "hands-free" start-up and/or access system for a vehicle in order for it to be able also to function with a mobile telephone equipped with other communication standards, such as, for example, ultra-wide band, or BLE (Bluetooth Low Energy®), or Wi-Fi (Wireless Fidelity) communication and no longer only via radio and low-frequency (RF and LF) waves. Ultra-wide band (UWB), in particular, is a radio modulation technique which is based on transmitting pulses of a very short duration, often less than a nanosecond. Thus, the passband may reach very large values.

BLE communication is, for its part, communication at a frequency in the region of 2.4 GHz.

The drawback of using BLE (ultra-high frequency) lies in the imprecision of the location of the mobile telephone. BLE is subject to a lot of interference which makes the location imprecise.

It is, then, recommended to use ultra-wide band to locate the mobile telephone more precisely.

The method for activating a vehicle function using a mobile telephone then consists in:

a. detecting, via BLE communication, the distant presence of the item of access equipment, that is to say in the region of 100 m around the vehicle, and establishing a first BLE communication link between the item of access equipment and the activation device, b. recognizing the identifier received via BLE by the vehicle, c. activating certain vehicle functions if appropriate, for example unlocking the vehicle by pressing a button on the remote control, d. detecting, via UWB, the close presence of the item of access equipment, that is to say in a radius of a few meters, for example 10 m, around the vehicle, and precisely locating the position of said item of equipment, e. activating the vehicle function, when the approach of the item of equipment toward the door or the contact of the hand close to the door is detected, for example unlocking, but also turning on the air conditioning, the heating and the radio and remotely controlling the car for the automatic parking mode.

The drawback of this method lies in the continuous location of the portable item of access equipment via ultra-wide-band communication, this causing excessive consumption of energy from the battery of the vehicle. This has an even greater impact when the user remains in the 10 m zone around the vehicle without having the intention of unlocking their vehicle. This may occur when the vehicle is parked in the garage belonging to a house, with the portable item of access equipment located in the house at a distance of less than 10 m from the vehicle, or when the user is sitting on a terrace less than 10 m from their vehicle.

In addition, when moving into the UWB communication zone, all the UWB transmitters which are present on the vehicle are activated in order to locate the portable item of access equipment precisely, this increasing the energy consumption.

In addition, according to the CCC, Car Connectivity Consortium, standard, ultra-wide-band communication is deactivated after 2 min of BLE connection. In other words, if the user stops on their way to the vehicle for more than 2 min, UWB communication is interrupted; if they resume their journey, they can no longer unlock their vehicle. This is what is called the "wall" effect.

With the method of the prior art, there is no means of detecting the intention of the user to unlock their vehicle.

SUMMARY OF THE INVENTION

An aspect of the invention therefore proposes a method for activating a vehicle function and an associated activation device making it possible to detect the intention of the user to unlock (or to lock) their vehicle, thus notably reducing the energy consumption of the UWB transmitters located on the vehicle and avoiding the "wall" effect.

An aspect of the invention proposes a method for activating a function of a motor vehicle by means of an activation device, from a portable item of "hands-free" access equipment carried by a user, comprising an accelerometer, a gyroscope and a magnetometer, the activation of the function being triggered by detection of the presence of the user in a predetermined zone around the vehicle, and depending on a result of authentication of the item of "hands-free" access equipment by the vehicle, the activation device comprising at least four ultra-wide-band transceiver external antenna modules which are able to communicate with said item of equipment in the ultra-wide band in a zone which is close to the vehicle, at least one of which modules is also able to communicate at ultra-high frequency in a zone which is far from the vehicle, the method being noteworthy in that it comprises the following steps:
  a. determining an initial position of the item of access equipment with respect to the vehicle,
  b. measuring the values from the gyroscope, from the magnetometer and from the accelerometer,
  c. obtaining a value of the probability of the intention to activate a vehicle function by applying a predictive model preliminarily trained with gyroscope, magnetometer and accelerometer values, and values of initial positions of said item of equipment,
  d. comparing the probability value with at least one predetermined threshold,
  e. transmitting, at ultra-high frequency from said item of equipment to the vehicle, a request to place the external antenna modules in partial or full ultra-wide-band communication operation, depending on the result of said comparison,
  f. activating the vehicle function, depending on an estimate of the distance between said item of equipment and the vehicle made by said external antenna modules thus activated in ultra-wide-band communication.

Preferably, the intention probability is obtained by applying a predictive model preliminarily trained with gyroscope, magnetometer and accelerometer values and values of initial positions of said item of equipment, during a preliminary phase of training said model consisting in supplying as input to said model various combinations of gyroscope, accelerometer, magnetometer and initial position values associated with an intention probability value.

Advantageously, if the value of the intention probability is:
  a. below a first threshold, then no activation request is transmitted,
  b. above a second threshold, a value of which is above the first threshold, then a request for full ultra-wide band activation of all the ultra-wide-band external antenna modules is transmitted,
  c. between the first threshold and the second threshold, then a request for partial ultra-wide band activation of only the external antenna modules which are on a side of the vehicle which the user is heading toward, is transmitted.

In a first embodiment, the initial position of the item of access equipment with respect to the vehicle is determined by geolocating said item of access equipment and by geolocating said vehicle and by transmitting the data on the geolocation of the vehicle to said item of equipment via ultra-high-frequency communication.

In a second embodiment, the vehicle being equipped with a magnetometer, with a gyroscope and with an accelerometer, the initial position of the item of access equipment with respect to the vehicle is determined by virtue of values from said magnetometer, gyroscope and accelerometer and by transmitting said values to the portable item of access equipment via ultra-high-frequency communication.

In a third embodiment, the initial position of the item of access equipment is determined with respect to the vehicle via ultra-wide-band communication between said item of equipment and said vehicle.

An aspect of the invention also relates to a portable item of access equipment, carried by a user, which is able to communicate at ultra-high frequency and in the ultra-wide band with a motor vehicle and comprises a gyroscope, an accelerometer and a magnetometer, which is noteworthy in that said item of equipment is also able to:
  a. obtain a value of the probability of the intention of the user to activate a vehicle function, from the values from said gyroscope, from said accelerometer and from said magnetometer and of an initial position of said item of equipment with respect to the vehicle,
  b. compare said value with at least one predetermined threshold,
  c. transmit, at ultra-high frequency, a request to place the external antenna modules in partial or full ultra-wideband communication operation, depending on the result of said comparison.

Preferably, the portable item of access equipment further comprises a predictive model preliminarily trained with values from the gyroscope, from the accelerometer and from the magnetometer and of the initial positions of said item of equipment with respect to the vehicle, making it possible to obtain the intention probability.

In the first embodiment, the portable item of access equipment comprises a satellite geolocation system and is able to:
  a. receive, via ultra-high-frequency communication, a geolocation value from the vehicle,
  b. determine an initial position of said item of equipment with respect to the vehicle depending on the value of the geolocation of the vehicle and on a value of the geolocation of said item of equipment.

In the second embodiment, the portable item of access equipment is able to:

a. receive, at ultra-high frequency, gyroscope, magnetometer and accelerometer values from the vehicle,
b. determine an initial position of said item of equipment with respect to the vehicle depending on said received values.

In the third embodiment, the portable item of access equipment is able to receive its initial position from the vehicle via ultra-wide-band communication.

An aspect of the invention relates to an activation device, intended to be installed on a motor vehicle, comprising at least four ultra-wide-band transceiver external antenna modules which are able to communicate in the ultra-wide band in a zone which is close to the vehicle, at least one of which modules is also able to communicate at ultra-high frequency in a zone which is far from the vehicle, said device being noteworthy in that it is able to:
  a. receive, from said item of equipment at ultra-high frequency, a request for partial or full ultra-wide-band communication activation of the external antenna modules,
  b. activate the vehicle function, depending on an estimate of the distance between said item of equipment and the vehicle made by said external antenna modules thus activated in ultra-wide-band communication.

In the first embodiment, the activation device is able to send a value of the geolocation of the vehicle to the portable item of equipment via ultra-high-frequency communication.

In the second embodiment, the activation device is able to send values from a gyroscope, from an accelerometer and from a magnetometer to the portable item of equipment at ultra-high frequency.

In the third embodiment, the activation device is able to determine an initial position of the portable item of equipment via ultra-wide-band communication and to send said position to said item of equipment.

An aspect of the invention also relates to any computer program product, comprising program code instructions for executing the steps of the method according to any one of the features listed above, when said program is executed on at least one computer.

An aspect of the invention applies to any activation system comprising a portable item of access equipment and an activation device according to any one of the features listed above.

Finally, an aspect of the invention is particularly applicable to any motor vehicle comprising an activation device according to any one of the features listed above.

BRIEF DESCRIPTION OF THE DRAWINGS

Other features and advantages of aspects of the invention will become more apparent upon reading the following description. This description is purely illustrative and should be read with reference to the appended drawings, in which:

FIG. 3 is a flowchart showing the various steps of the activation method.

DETAILED DESCRIPTION OF THE PREFERRED EMBODIMENTS

Figure 1:
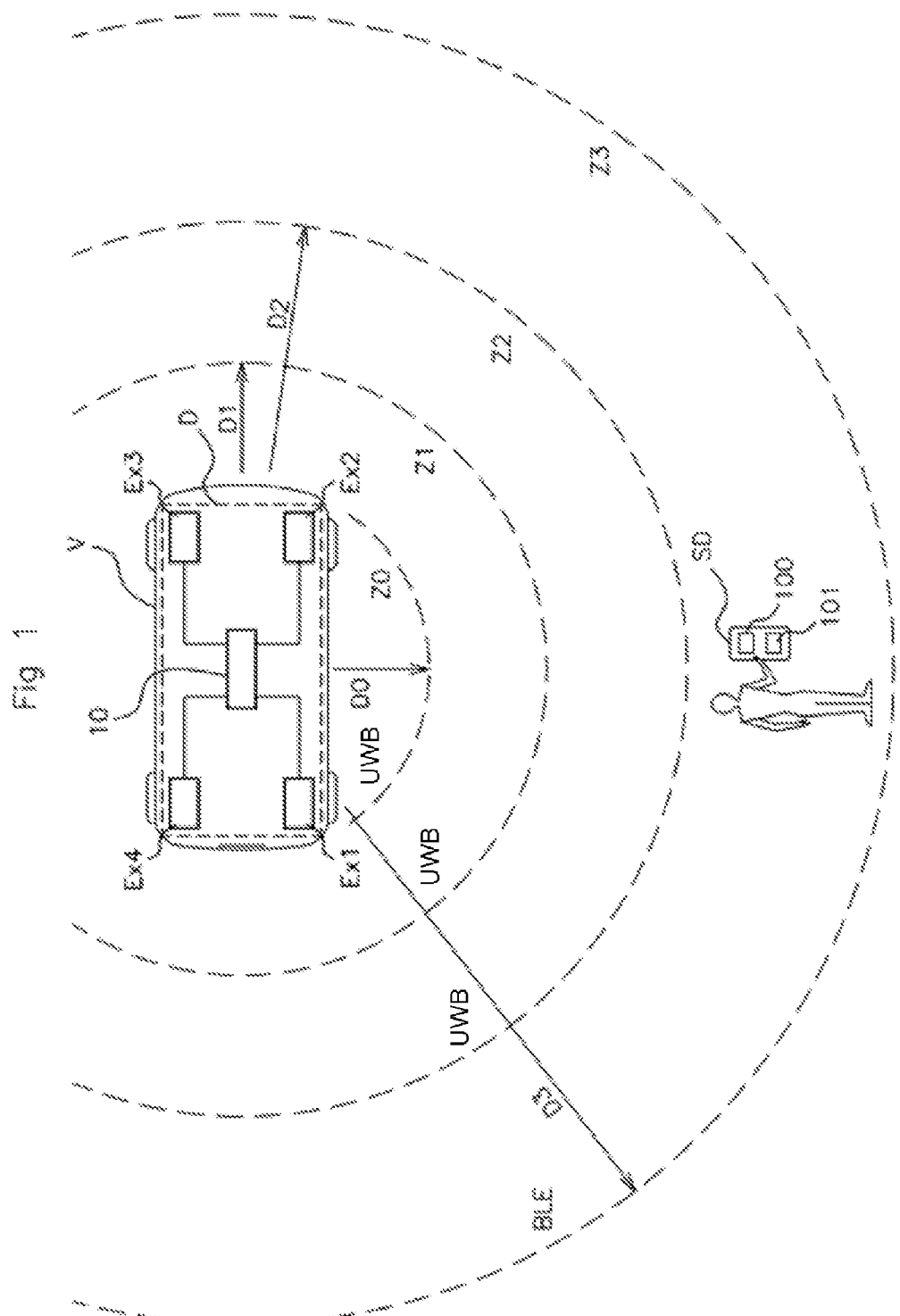
FIG. 1 schematically shows a motor vehicle equipped with an activation device according to an aspect of the invention, as well as a user provided with a portable item of hands-free access equipment located in a zone which is close to the vehicle, FIG. 2 schematically shows the portable item of access equipment and the vehicle equipped with the activation device according to an aspect of the invention.

FIG. 1 shows a motor vehicle V, equipped with a device for activating a vehicle function according to an aspect of the invention.

The activation device D comprises at least four ultra-wide-band UWB transceiver external antenna modules Ex1, Ex2, Ex3, Ex4 which are able to communicate, in the ultra-wide band in a zone Z0, Z1, Z2 which is close to the vehicle V, with a portable item of access equipment SD carried by a user U, at least one of which modules, for example Ex1, is also able to communicate at ultra-high frequency BLE with said portable item of access equipment SD at ultra-high frequency in a zone Z3 which is far from the vehicle.

What is meant by ultra-wide band UWB is radiofrequency communication which is based on transmitting pulses of a very short duration, often less than a nanosecond. Thus, the passband may reach very large values between 250 and 500 MHz.

What is meant by BLE (Bluetooth Low Energy) communication is ultra-high-frequency communication in the region of 2.4 GHz.

As already explained, the activation method of the prior art consists in:
  a. detecting, via BLE communication, the distant presence of the item of access equipment SD, in the zone Z3 which is far from the vehicle, that is to say in the region of 100 m around the vehicle V, and establishing a first BLE communication link between the item of access equipment SD and the activation device D, by virtue of at least one external antenna module Ex1,
  b. receiving, via BLE, an identifier of said item of equipment SD via said vehicle, and recognizing it as being an identifier of a portable item of equipment preliminarily associated with the vehicle V,
  c. activating certain functions of the vehicle V, if appropriate, for example remotely unlocking the vehicle by pressing a button on the remote control, if the item of access equipment SD comprises such a remote unlocking push-button,
  d. detecting, via UWB, by virtue of all the external antenna modules Ex1 . . . Ex4 of the activation device D, the close presence of the item of access equipment, that is to say in a zone Z0, Z1, Z2 which is close to the vehicle, for example between 0 and 10 m from the vehicle, and locating said item of equipment SD precisely,
  e. activating a vehicle function depending on the distance D0, D1, D2, D3 (cf. FIG. 1) separating said item of equipment SD from the vehicle V, for example automatically unlocking the door when the user is close to the door, or turning on the air conditioning, the heating or the radio or controlling the vehicle V remotely for the automatic parking mode, when the user U is a few meters from their vehicle.

As explained above, according to the prior art, once the portable item of equipment SD is in a zone which is close to the vehicle V, said item of equipment SD is then in continuous ultra-wide-band communication UWB with the activation device D, whatever the intention of the user U, even if they have no intention of activating a function of their vehicle. This method of the prior art is therefore very energy-intensive in terms of communication between the item of equipment SD and the activation device D.

In the prior art, the portable item of access equipment SD, for its part, is relatively passive, and does nothing but send its identifier to the vehicle V, or respond to the ultra-high-frequency and ultra-wide-band calls transmitted by the vehicle V.

An aspect of the invention proposes for the portable item of access equipment SD to become active in activating the functions of the vehicle V and, to this end, said item of equipment SD, preliminarily equipped with a magnetometer MG, with an accelerometer ACC and with a gyroscope G, is able to:
a. obtain a value of the probability of the intention PI of the user to activate a vehicle function, from the values from said gyroscope G, from said accelerometer ACC and from said magnetometer MG and of an initial position POS(0) of said item of equipment SD with respect to the vehicle V,
b. compare said value PI with at least one predetermined threshold, S1, S2,
c. transmit, at ultra-high frequency BLE, a request to place the external antenna modules in partial S(A1) or full S(A2) ultra-wide-band communication operation, depending on the result of said comparison.

Figure 2:
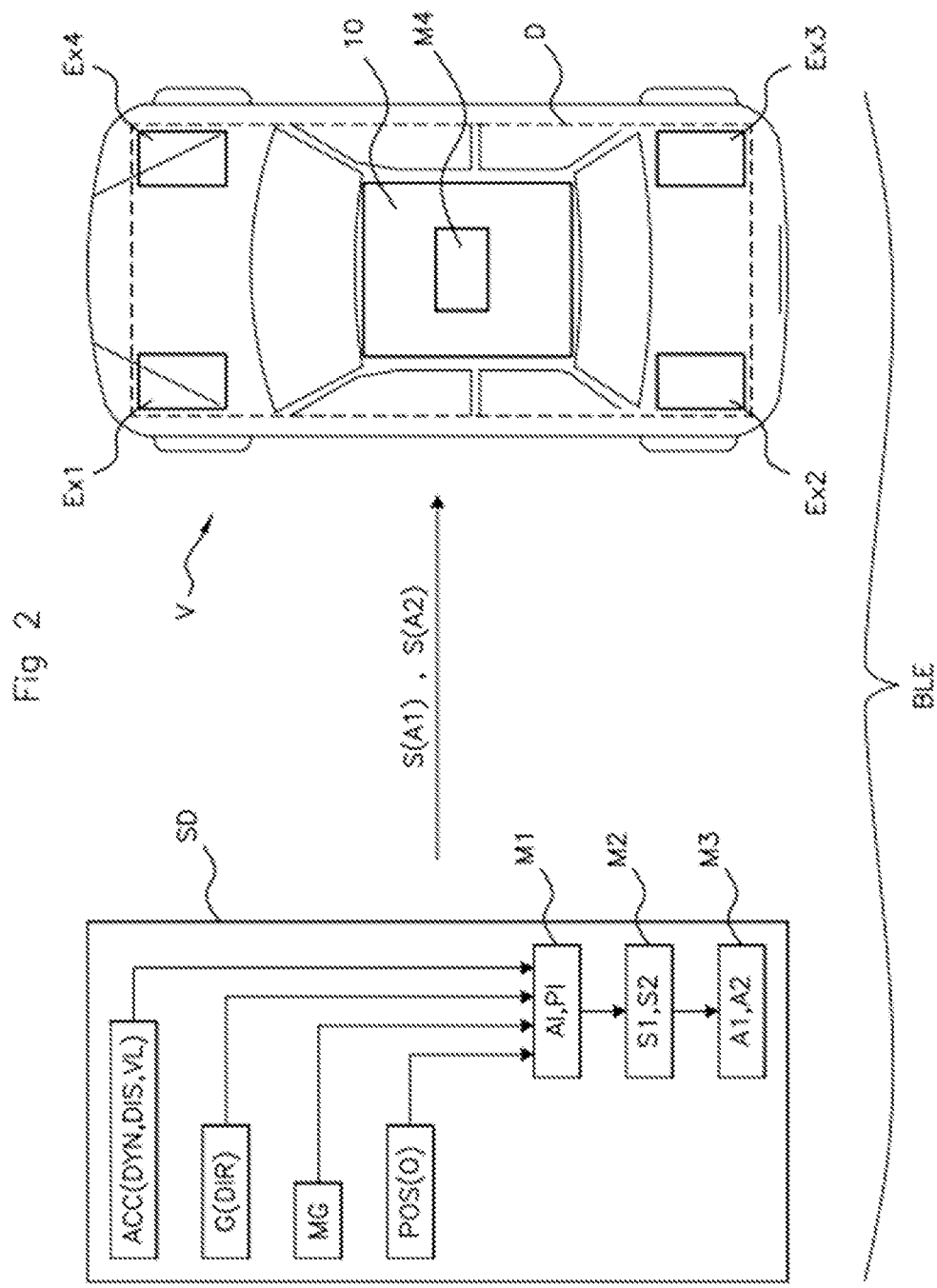

To this end, the portable item of access equipment SD comprises means M1 (cf. FIG. 2) for calculating an intention probability PI depending on the values from the gyroscope G, from the accelerometer ACC, from the magnetometer MG and of an initial position POS(0) of said item of equipment SD with respect to the vehicle V. Preferably, the calculation means M1 consist in applying a predictive model preliminarily trained with gyroscope G, magnetometer MG and accelerometer ACC values and values of initial positions POS(0), during a preliminary phase of training said model consisting in supplying as input to said model various combinations of gyroscope G, accelerometer ACC, magnetometer MG and initial position POS(0) values each associated with an intention probability value PI.

The applicant has found that using artificial intelligence and a preliminarily trained neural network was particularly appropriate to an aspect of the invention and made it possible to determine a relatively reliable intention probability PI.

Said intention probability PI may take a value of between 0% and 100%.

The portable item of equipment SD also comprises means M2 (cf. FIG. 2) for comparing the intention probability value PI and at least one predetermined threshold.

In this example, two thresholds S1, S2 will be considered.

For example, the first threshold S1 is equal to 50% and the second threshold S2 is equal to 75%.

To this end, the portable item of access equipment SD comprises a processor 100, and a memory 101 (cf. FIG. 1) in which there are stored instructions making it possible to configure the processor to execute certain particular processing operations, notably to implement the steps of the activation method according to a particular embodiment and as is described below.

The portable item of access equipment SD also comprises means M3 (cf. FIG. 2) for transmitting, at ultra-high frequency BLE, a request for partial S(A1) or full S(A2) ultra-wide-band communication activation of the external antenna modules of the vehicle Ex1, Ex2, Ex3, Ex4, depending on the result of this comparison. This will be detailed in the activation method below.

In a first embodiment, the item of access equipment SD is further equipped with geolocation means and can receive, at ultra-high frequency BLE, the geolocation of the vehicle V and has means for determining its initial position POS(0) with respect to the vehicle V depending on the two geolocation values.

In a second embodiment, the portable item of access equipment SD is able to receive values from the gyroscope, from the magnetometer and from the accelerometer which are installed in the vehicle V and has means for determining its initial position POS(0) with respect to the vehicle V depending on these values and on its own values, either geolocation values or values from its own sensors, the gyroscope G, accelerometer ACC and magnetometer MG.

In a third embodiment, the portable item of equipment SD is able to receive its initial position POS(0), which was determined by the vehicle V (i.e. by the activation device D) during preliminary ultra-wide-band communication with said item of equipment SD, for example when the user leaves their vehicle and when they are in a zone which is close to the vehicle V.

The activation device D, for its part, is able to:
a. receive, at ultra-high frequency BLE from the portable item of equipment SD, a request for partial S(A1) or full S(A2) ultra-wide-band communication UWB activation of the external antenna modules Ex1, Ex2, Ex3, Ex4,
b. activate the vehicle function F1, F2, depending on an estimate of the distance D0, D1, D2, D3 between said item of equipment SD and the vehicle V made by said external modules thus activated in ultra-wide-band communication.

To this end, the activation device D comprises means M4 (cf. FIG. 2) for partial or full activation of the external antenna modules depending on the request which it receives from the portable item of access equipment SD. The activation device D comprises, in a manner known per se, a microprocessor and a memory which are, however, modified according to an aspect of the invention in order to make it possible to partially activate the external antenna modules integrated into a microcontroller 10.

What is meant by full operation or full activation of the external antenna modules is turning on all the external antenna modules.

What is meant by partial operation or partial activation of the external antenna modules is turning on only some of the external antenna modules.

In the first embodiment, the activation device D is able to send the geolocation of the vehicle to the portable item of equipment SD via ultra-high-frequency communication BLE.

In the second embodiment, the vehicle V also being equipped with a gyroscope, with a magnetometer and with an accelerometer, the activation device D is able to send, at ultra-high frequency BLE®, values from these three sensors to the portable item of equipment SD.

In the third embodiment, the activation device D is able to determine, via ultra-wide-band communication UWB, the position of the portable item of equipment SD with respect to the vehicle V and to send said position to said item of equipment.

The activation method, illustrated in FIG. 3, will now be described.

During a first step E1, the initial position POS(0) of the portable item of equipment SD with respect to the vehicle V is determined.

In a first embodiment, the portable item of equipment SD and the vehicle V are each equipped with geolocation means. The vehicle sends, at ultra-high frequency BLE, its geolocation to the item of equipment SD, which compares it with its own geolocation and deduces therefrom the distance D0, D1, D2, D3 separating them, that is to say the initial position POS(0) of the item of access equipment SD.

In a second embodiment, the vehicle V sends, at ultra-high frequency to the portable item of equipment SD, the values from its installed sensors, more specifically the values from the gyroscope, from the accelerometer and from the magnetometer which are installed on the vehicle and the portable item of equipment SD from these values and from its own values (geolocation or gyroscope, accelerometer and magnetometer sensors) and deduces therefrom its initial position POS(0) with respect to the vehicle V.

In a third embodiment, which is the case where the user leaves their vehicle V, and is in a zone which is close to the vehicle where ultra-wide-band communication is activated, then the initial relative position POS(0) of the item of equipment SD with respect to the vehicle V is determined by ultra-wide-band UWB signal exchange, the vehicle V then being able, from the flight time or from the intensity of the signals received from the item of equipment SD, determine the distance D0, D1, D2, D3 separating it from said item of equipment. The initial position POS(0) of the item of equipment SD with respect to the vehicle V is then sent in the ultra-wide band from the vehicle V to said item of equipment in order perform the rest of the steps of the method according to an aspect of the invention.

During a second step E2, the values from the gyroscope G, from the magnetometer MG and from the accelerometer ACC of the item of equipment SD as a function of time t, as well as the initial position POS(0), are stored in the memory of the item of equipment, then are used during a third step E3 by a predictive model in order to obtain a probability of the intention PI of the user.

It is known to a person skilled in the art that accelerometer values make it possible to determine a movement speed VL and the number of steps taken by the user U, a distance traveled DIS, for example from the initial position POS(0), and to know whether the item of equipment is in a static position or dynamic position DYN. The gyroscope G, for its part, makes it possible to determine a movement direction DIR, the position of the portable item of equipment SD (roll, pitch, yaw) and the magnetometer MG, after correction with the values from the gyroscope G, makes it possible, for its part, to determine the direction of movement of the item of equipment SD with respect to the vehicle V.

The predictive model is an artificial intelligence model which comprises a neural network and has been preliminarily trained with combinations of gyroscope G, accelerometer ACC, magnetometer MG and initial position POS(0) values, each associated with a probability of the intention PI of the user.

This intention probability PI may, for example, be a value of between 0% and 100%.

During a fourth step E4, the intention probability value PI is compared with a first threshold S1 which is, for example, equal to 50%. If the value PI is below S1, this means that the probability of the intention of the user to activate a function of the vehicle V is low. For example, they are moving at a low speed, making lots of pauses on their way. Their intentions are unclear. No request is sent by the item of access equipment SD to the vehicle V. The portable item of equipment SD continues to store the values from the sensors, the gyroscope G, magnetometer MG and accelerometer ACC, and to determine or to update the intention probability value PI.

If the value of the intention probability PI is above the first threshold S1, then said value is compared with a second threshold S2 (step E5) of a value above the first threshold S1; for example the second threshold S2 has a value of 75%.

If the intention probability value PI is above the second threshold S2, this means that the probability of the intention of the user U to activate a vehicle function is very high; in other words, it has been detected, for example, that they are moving very quickly in the direction of their vehicle V.

In this case, a request S(A2) for full ultra-wide-band UWB activation of the external antenna modules is sent to the vehicle V (step E6a). The vehicle V receives this request and activates all the external antenna modules which are present on the vehicle V in ultra-wide-band communication mode (step E7a). The position of the item of access equipment SD with respect to the vehicle V is then estimated with all the external antenna modules Ex1 ... Ex4 thus woken up and the one or more vehicle functions F2 corresponding to said position may be triggered (step E8a).

If the probability value PI is between the two thresholds S1, S2, then it is concluded that the intention probability is average. In this case, a request S(A1) for partial ultra-wide-band activation of the external antenna modules, for example only a first module Ex1 and a second module Ex2, is sent by the portable item of equipment SD to the vehicle V (step E6b). Once the request has been received by the vehicle V, only the first and the second modules Ex1, Ex2 are placed in ultra-wide-band communication UWB operation (step E7b). In this example, these are the modules located on the side of the vehicle V which the user is heading toward which are woken up in order to be able to communicate in the ultra-wide band with the portable item of access equipment SD.

Of course, the probability of the intention PI to activate a vehicle function applies just as much to the case where the user is heading toward their vehicle V in order to unlock it as to the case where they are leaving their vehicle in order to lock it. The analysis of the data from the sensors carried out by the portable item of equipment takes into account, in this latter case, as for the arrival of the user at their vehicle, their movement speed, their movement direction, etc.

The position of the item of access equipment SD with respect to the vehicle V is then estimated only with the external antenna modules Ex1, Ex2 thus woken up, that is to say with only some of the modules which are present on the vehicle V, and the one or more vehicle functions F1 corresponding to said position may be triggered (step E8b).

The vehicle functions F2, which may be triggered by virtue of activating all the external antenna modules, are functions requiring a precise location of the portable item of access equipment SD, for example hands-free access to the vehicle, or locking or unlocking the driver's door or the trunk of the vehicle V.

The vehicle functions F1, which may be triggered by virtue of activating only some of the external antenna modules, are functions not requiring a precise location of the portable item of equipment SD, for example switching on the headlights of the vehicle, or turning on the interior lighting of the vehicle, this being called welcome lighting.

An aspect of the invention therefore ingeniously makes it possible to detect the intention of the user to activate vehicle functions by virtue of their portable item of access equipment and not to place all the external antenna modules in ultra-high-frequency operation if a high intention probability is not detected. Thus, the non-activated modules remain in standby mode and consume less energy than according to the prior art method.

In addition, no private data relating to the user are supplied by the portable item of equipment to the vehicle, just the intention probability, which is a value derived from the measurements performed by the sensors installed in said item of equipment and not a raw value from these sensors. The method according to an aspect of the invention therefore does not infringe any legislation on the protection of personal user data.

The invention claimed is:

1. A method for activating a function of a motor vehicle by an activation device, from a portable item of "hands-free" access equipment carried by a user, comprising an accelerometer, a gyroscope and a magnetometer, the activation of the function being triggered by detection of the presence of the user in a predetermined zone around the vehicle, and depending on a result of authentication of the item of "hands-free" access equipment by the vehicle, the activation device comprising at least four ultra-wide-band transceiver external antenna modules which are able to communicate with said item of equipment in the ultra-wide band in a zone which is close to the vehicle, at least one of which modules is also able to communicate at ultra-high frequency in a zone which is far from the vehicle, wherein the method comprises:

determining an initial position POS(0) of the item of access equipment with respect to the vehicle,
measuring the values from the gyroscope, from the magnetometer and from the accelerometer,
obtaining a value of the probability of the intention to activate a vehicle function by applying a predictive model preliminarily trained with gyroscope, magnetometer and accelerometer values, and values of initial positions of said item of equipment,
comparing the probability value with at least one predetermined threshold,
transmitting, at ultra-high frequency from said item of equipment to the vehicle, a request to place the external antenna modules in partial or full ultra-wide-band communication operation, depending on the result of said comparison, and
activating the vehicle function, depending on an estimate of the distance between said item of equipment and the vehicle made by said external antenna modules thus activated in ultra-wide-band communication,
wherein the intention probability is obtained by applying a predictive model preliminarily trained with gyroscope, magnetometer and accelerometer values and values of initial positions of said item of equipment, during a preliminary phase of training said model consisting in supplying as input to said model various combinations of gyroscope, accelerometer, magnetometer and initial position values associated with an intention probability value.

2. A method for activating a function of a motor vehicle by an activation device, from a portable item of "hands-free" access equipment carried by a user, comprising an accelerometer, a gyroscope and a magnetometer, the activation of the function being triggered by detection of the presence of the user in a predetermined zone around the vehicle, and depending on a result of authentication of the item of "hands-free" access equipment by the vehicle, the activation device comprising at least four ultra-wide-band transceiver external antenna modules which are able to communicate with said item of equipment in the ultra-wide band in a zone which is close to the vehicle, at least one of which modules is also able to communicate at ultra-high frequency in a zone which is far from the vehicle, wherein the method comprises:

determining an initial position POS(0) of the item of access equipment with respect to the vehicle,
measuring the values from the gyroscope, from the magnetometer and from the accelerometer,
obtaining a value of the probability of the intention to activate a vehicle function by applying a predictive model preliminarily trained with gyroscope, magnetometer and accelerometer values, and values of initial positions of said item of equipment,
comparing the probability value with at least one predetermined threshold,
transmitting, at ultra-high frequency from said item of equipment to the vehicle, a request to place the external antenna modules in partial or full ultra-wide-band communication operation, depending on the result of said comparison, and
activating the vehicle function, depending on an estimate of the distance between said item of equipment and the vehicle made by said external antenna modules thus activated in ultra-wide-band communication,
wherein, if the value of the intention probability is:
below a first threshold, then no activation request is transmitted,
above a second threshold, a value of which is above the first threshold, then a request for full ultra-wide band activation of all the ultra-wide-band external antenna modules is transmitted,
between the first threshold and the second threshold, then a request for partial ultra-wide band activation of only the external antenna modules which are on a side of the vehicle which the user is heading toward, is transmitted.

3. The activation method as claimed in claim 1, wherein the initial position of the item of access equipment with respect to the vehicle is determined by geolocating said item of access equipment and by geolocating said vehicle and by transmitting the data on the geolocation of the vehicle to said item of equipment via ultra-high-frequency communication.

4. The activation method as claimed in claim 1, wherein, the vehicle being equipped with a magnetometer, with a gyroscope and with an accelerometer, the initial position of the item of access equipment with respect to the vehicle is determined by virtue of values from said magnetometer, gyroscope and accelerometer and by transmitting said values to the portable item of access equipment via ultra-high-frequency communication.

5. The activation method as claimed in claim 1, wherein the initial position of the item of access equipment is determined with respect to the vehicle via ultra-wide-band communication between said item of equipment and said vehicle.

6. A portable item of access equipment, carried by a user, which is able to communicate at ultra-high frequency and in the ultra-wide band with an activation device, intended to be installed on a motor vehicle and comprising a gyroscope, an accelerometer and a magnetometer, wherein said item of equipment is also able to:

obtain a value of the probability of the intention of the user to activate a vehicle function, from the values from said gyroscope, from said accelerometer and from said magnetometer and of an initial position of said item of equipment with respect to the vehicle,
compare said value with at least one predetermined threshold, transmit, at ultra-high frequency, a request to place the external antenna modules in partial or full ultra-wide-band communication operation, depending on the result of said comparison, wherein the portable item of access equipment further comprises a predictive model preliminarily trained with values from the gyroscope, from the accelerometer and from the magnetometer and of the initial positions of said item of equipment with respect to the vehicle, making it possible to obtain the intention probability.

7. The portable item of access equipment as claimed in claim 6, wherein it comprises a satellite geolocation system and it is able to:

receive, via ultra-high-frequency communication, a geolocation value from the vehicle, determine an initial position of said item of equipment with respect to the vehicle depending on the value of the geolocation of the vehicle and on a value of the geolocation of said item of equipment.

8. The portable item of access equipment as claimed in claim 6, wherein it is able to:

receive, at ultra-high frequency, gyroscope, magnetometer and accelerometer values from the vehicle, determine an initial position of said item of equipment with respect to the vehicle depending on said received values.

9. The portable item of access equipment as claimed in claim 6, wherein it is able to receive its initial position from the vehicle via ultra-wide-band communication.

10. An activation system, comprising:

a portable item of access equipment carried by a user, which is able to communicate at ultra-high frequency and in the ultra-wide band with an activation device, intended to be installed on a motor vehicle and comprising a gyroscope, an accelerometer and a magnetometer, wherein said item of equipment is also able to:

obtain a value of the probability of the intention of the user to activate a vehicle function, from the values from said gyroscope, from said accelerometer and from said magnetometer and of an initial position of said item of equipment with respect to the vehicle, compare said value with at least one predetermined threshold, transmit, at ultra-high frequency, a request to place the external antenna modules in partial or full ultra-wide-band communication operation, depending on the result of said comparison, and an activation device, intended to be installed on the motor vehicle, comprising at least four ultra-wide-band transceiver external antenna modules which are able to communicate with a portable item of access equipment in the ultra-wide band in a zone which is close to the vehicle, at least one of which modules is also able to communicate with said portable item of access equipment at ultra-high frequency in a zone which is far from the vehicle, wherein said device is able to:

receive, from said item of equipment at ultra-high frequency, a request for partial or full ultra-wide-band communication activation of the external antenna modules, and activate the vehicle function, depending on an estimate of the distance between said item of equipment and the vehicle made by said external antenna modules thus activated in ultra-wide-band communication.

11. The activation system as claimed in claim 10, wherein the activation device is able to send values from a gyroscope, from an accelerometer and from a magnetometer to the portable item of equipment.

12. The activation system as claimed in claim 10, wherein the activation device is able to determine an initial position of the portable item of equipment via ultra-wide-band communication and to send said position to said item of equipment.

13. A non-transitory computer program product, comprising program code instructions for executing the steps of the method as claimed in claim 1 when said program is executed on a computer.

14. The activation system as claimed in claim 10, wherein the activation device is able to send a value of the geolocation of the vehicle to the portable item of equipment.

15. A motor vehicle, wherein it comprises an activation system as claimed in claim 10.

* * * * *